(12) United States Patent
Cornish

(10) Patent No.: US 10,633,260 B2
(45) Date of Patent: Apr. 28, 2020

(54) SCUM FILTRATION SYSTEM

(71) Applicant: Charles Cornish, Nashville, MI (US)

(72) Inventor: Charles Cornish, Nashville, MI (US)

( * ) Notice: Subject to any disclaimer, the term of this patent is extended or adjusted under 35 U.S.C. 154(b) by 0 days.

(21) Appl. No.: 16/584,928

(22) Filed: Sep. 26, 2019

(65) Prior Publication Data

US 2020/0095135 A1 Mar. 26, 2020

Related U.S. Application Data

(63) Continuation-in-part of application No. 29/676,897, filed on Jan. 15, 2019.

(Continued)

(51) Int. Cl.
*B01D 17/02* (2006.01)
*B01D 21/00* (2006.01)
(Continued)

(52) U.S. Cl.
CPC .......... *C02F 1/001* (2013.01); *B01D 17/0214* (2013.01); *B01D 21/0027* (2013.01);
(Continued)

(58) Field of Classification Search
CPC ........ C02F 1/001; C02F 1/24; C02F 29/0072; C02F 2303/22; C02F 2103/007; B01D 17/00; B01D 17/02; B01D 17/0208; B01D 21/0027; B01D 29/0072; B01D 29/11; B01D 29/13; B01D 29/90; B01D 29/96; B01D 35/05; B01D 2201/18; B01D 2201/20; B01D 2201/586; E02B 15/00; E02B 15/04; E02B 15/045; E02B 15/046; E02B 15/048; E02B 15/10; E02B 15/101; B63B 35/00; B63B 35/34; B63B 35/38; B63B 35/44; B63B 2035/002; B63B 2035/446
USPC ........... 210/121, 122, 170.05, 170.09, 242.1, 210/242.3, 258, 416.1, 459, 747.6, 776, 210/923; 114/264–267; 405/60, 63, 96, 405/97
See application file for complete search history.

(56) References Cited

U.S. PATENT DOCUMENTS 1,450,545 A * 4/1923 Hans .................. B01D 17/0214
210/122
2,330,508 A * 9/1943 McColl .............. B01D 17/0208
210/242.3
(Continued)

FOREIGN PATENT DOCUMENTS

EP 1096082 B1 4/2004
KR 19980067547 U 12/1998

*Primary Examiner* — Joseph W Drodge

(57) ABSTRACT

A scum filtration system is used to separate, collect, capture, and remove surface scum and contaminants from a body of standing water. The scum filtration system includes at least one treatment assembly, a pumping system, and a main support structure. The at least one treatment assembly is used to filter scum, contaminants, and other similar material from a body of water such as, but not limited to, a pond or lake. The pumping system is used to drive water from a pond or lake into the at least one treatment assembly. The main support structure is used to support the at least one treatment assembly. Further, the main support structure is used to maintain the arrangement of the at least one treatment assembly.

14 Claims, 10 Drawing Sheets

Related U.S. Application Data

(60) Provisional application No. 62/736,970, filed on Sep. 26, 2018.

(51) Int. Cl.
    *B01D 29/00*      (2006.01)
    *C02F 1/00*      (2006.01)
    *C02F 103/00*      (2006.01)

(52) U.S. Cl.
    CPC ...... *B01D 29/0072* (2013.01); *B01D 2201/18* (2013.01); *C02F 2103/007* (2013.01); *C02F 2303/22* (2013.01)

(56) References Cited

U.S. PATENT DOCUMENTS

| | | | |
|---|---|---|---|
| 2,908,393 A * | 10/1959 | Lanphier | B63B 35/4413 210/242.3 |
| 3,221,884 A * | 12/1965 | Muller | E02B 15/06 210/242.3 |
| 3,667,608 A * | 6/1972 | Burroughs | A47L 13/20 210/242.4 |
| 3,669,275 A * | 6/1972 | Downs | E02B 15/10 210/242.4 |
| 3,688,909 A * | 9/1972 | Titus | E02B 15/106 210/242.3 |
| 3,754,653 A * | 8/1973 | Verdin | E02B 15/048 210/197 |
| 4,154,678 A | 5/1979 | Kole | |
| 4,818,389 A | 4/1989 | Tobias et al. | |
| 4,842,735 A * | 6/1989 | Hollis | E02B 15/104 210/242.3 |
| 5,030,342 A * | 7/1991 | Ortega | E02B 15/106 210/122 |
| 5,040,918 A * | 8/1991 | Taricco | E02B 15/08 405/66 |
| 5,108,591 A * | 4/1992 | Hagan | E02B 15/106 210/104 |
| 5,143,605 A | 9/1992 | Masciarelli | |
| 5,149,443 A * | 9/1992 | Varnam | B01D 17/0214 210/739 |
| 5,814,213 A * | 9/1998 | Glasgow | E02B 15/046 210/703 |
| 5,820,751 A * | 10/1998 | Faircloth, Jr. | B01D 21/2444 210/122 |
| 6,120,681 A * | 9/2000 | Heo | B01F 3/04985 166/366 |
| 6,312,228 B1 * | 11/2001 | Mori | F04D 7/02 417/61 |
| 7,022,223 B2 | 4/2006 | Lovestead et al. | |
| 7,314,571 B2 * | 1/2008 | Lovestead | E02B 15/00 |
| 7,326,354 B2 * | 2/2008 | Ferreira | E02B 15/06 210/776 |
| 7,790,023 B1 * | 9/2010 | Mills | B01D 21/2444 210/122 |
| 10,051,788 B2 * | 8/2018 | Jirik | E02B 15/00 |
| 10,202,290 B1 * | 2/2019 | Fesi | C02F 1/40 |
| 2003/0062297 A1 * | 4/2003 | Rosquist | E02B 15/06 210/242.3 |
| 2009/0194472 A1 * | 8/2009 | Jack | C02F 1/40 |
| 2010/0236999 A1 * | 9/2010 | Utsunomiya | B01D 17/0214 210/739 |
| 2011/0297621 A1 * | 12/2011 | Crouse | E02B 15/046 210/703 |
| 2015/0321838 A1 * | 11/2015 | Wu | E02B 17/08 405/210 |
| 2016/0010433 A1 * | 1/2016 | Kanstad | B01F 3/04985 166/366 |
| 2016/0318776 A1 * | 11/2016 | Kim | B01D 17/0214 |

\* cited by examiner

SCUM FILTRATION SYSTEM

The current application claims a priority to the U.S. Provisional Patent application Ser. No. 62/736,970 filed on Sep. 26, 2018.

FIELD OF THE INVENTION

The present invention relates generally to an apparatus that may separate, collect, capture, and remove surface contaminants from a body of standing water.

BACKGROUND OF THE INVENTION

In present times, individuals are known to employ filtration systems and treatments to bodies of standing water in order to reduce or eliminate the presence of surface-growth algae or other similar blooming organics. Similar filtration systems may be employed to remove surface debris such as leaves, pollen, twigs, and other small detritus by sequestering said debris into an internal capture housing. Systems known in the industry are generally understood to be either submersible (anchored at the bottom of a body of water) or "surface skimmers", sometimes capable of self-propulsion in order to effectively sanitize the surface of a pond, lake, river, or similar body of water. Filtration may be desirable in order to prevent the ecological damage associated with uncontrolled harmful algae blooms, understood to reduce the volume of oxygen in a body of water and potentially cause large-scale die-offs of any subsurface creatures. Skimmers may additionally be employed to enhance the aesthetic qualities of a shoreside area, increasing the clarity of the water and possibly reducing the smell of putrefaction generally associated with said die-offs. Such systems are normally equipped with a filter basket or capture system, requiring frequent manual interaction (emptying the sequestered debris) in order to remain operational. Particularly for units that feature a debris storage section attached to the main body of the filtration system, emptying the basket may prove difficult. Further, systems may become clogged or otherwise disabled by a high volume of surface debris, necessitating manual maintenance and correction. Even when functioning properly, systems known in the industry are understood to require routine cleaning or replacement of the filtration element as in becomes inundated with particulate matter.

The present invention aims to provide a continuously operating means of filtering and treating the surface of any body of water via a buoyant skimmer and a remote filtration device. This arrangement will ensure that the user has easy access to the serviceable segment of the present invention, without requiring the capture of the skimmer unit. The present invention further features a reversable "backflush" function that will allow a user to clean the present invention without directly interacting with the contaminated filtration media. This functionality will be enabled via a series of operable controls exposed to the user during normal operations, requiring only an external source of clean "flush" water (ideally provided via a standard household water source) and no other special tools.

DETAIL DESCRIPTIONS OF THE INVENTION

All illustrations of the drawings are for the purpose of describing selected versions of the present invention and are not intended to limit the scope of the present invention.

In reference to FIGS. 1 through 10, the present invention is a scum filtration system used to separate, collect, capture, and remove surface scum and contaminants from a body of standing water. A preferred embodiment of the present invention comprises at least one treatment assembly 1, a pumping system 7, and a main support structure 11. The at least one treatment assembly 1 is used to filter scum, contaminants, and other similar material from a body of water such as, but not limited to, a pond, lake, or any kind of body of water. The pumping system 7 is used to drive water from a pond or lake into the at least one treatment assembly 1. The main support structure 11 is used to support the at least one treatment assembly 1. Further, the main support structure 11 is used to maintain the arrangement of the at least one treatment assembly 1.

Figure 1:
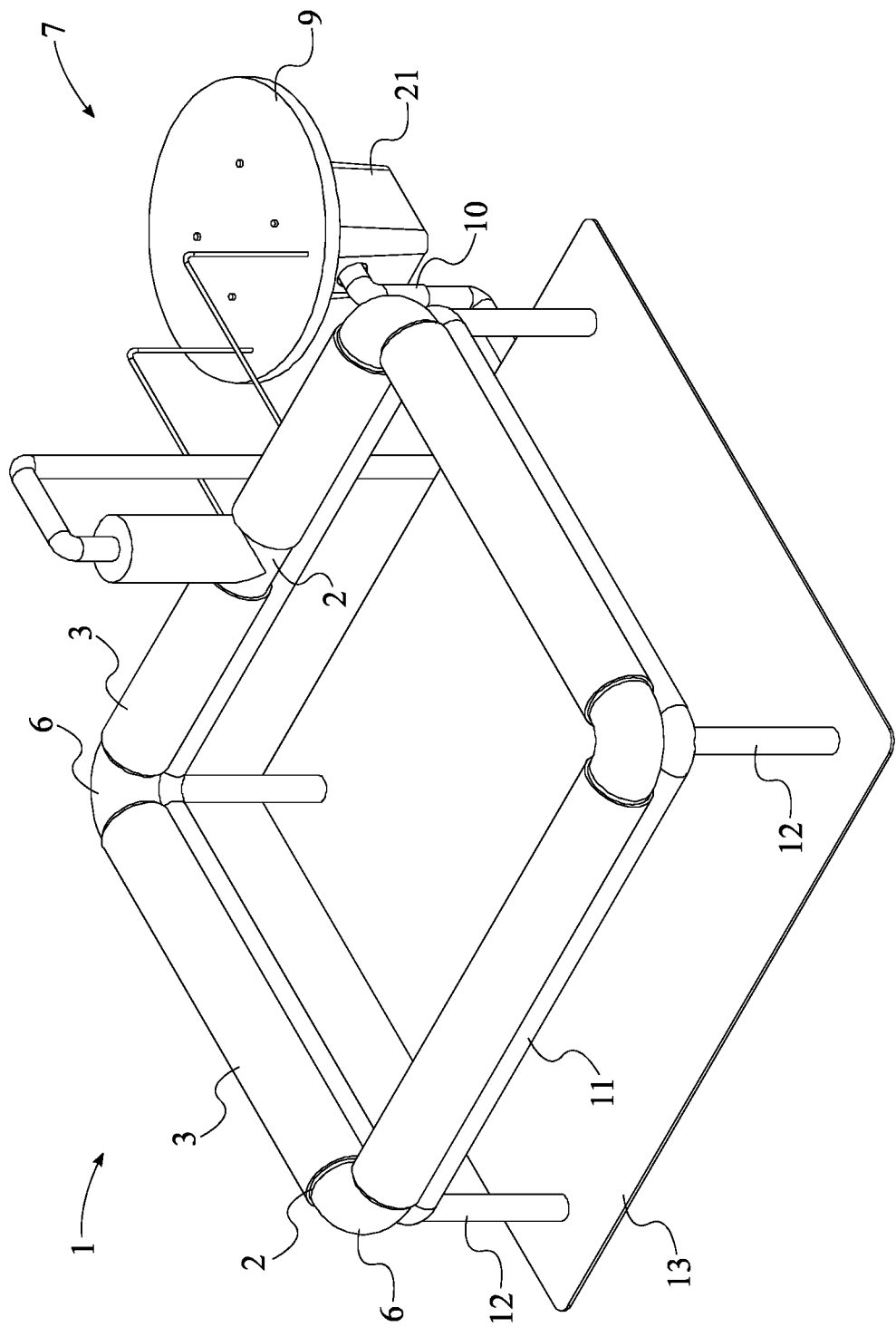
FIG. 1 is a front perspective view of the present invention.
Figure 2:
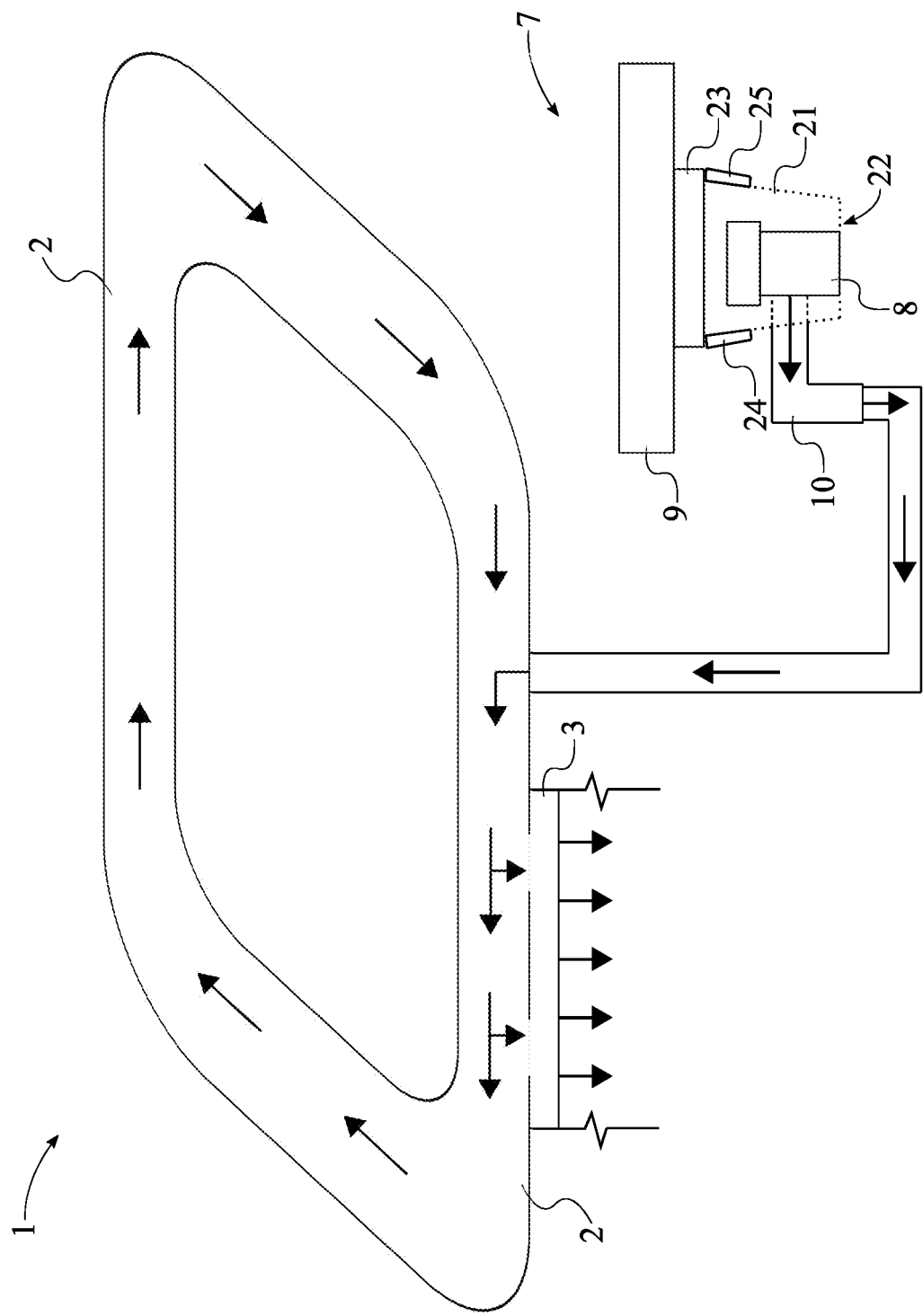
FIG. 2 is a schematic view of the present invention illustrating the fluid flow.

The general configuration of the aforementioned components allows the present invention to separate, collect, capture, and remove surface scum and contaminants from a body of standing water. With reference to FIGS. 1 and 2, the at least one treatment assembly 1 comprises a plurality of perforated pipes 2 and a plurality of filtering covers 3. The plurality of perforated pipes 2 allows water to flow through their tubular bodies and laterally drip out of their perforations. The plurality of perforated pipes 2 is preferably corrugated. The plurality of filtering covers 3 prevents scum and contaminants from seeping out of the at least one treatment assembly 1. Moreover, the pumping system 7 comprises a fluid pump 8 and a floatation device 9. The fluid pump 8 is a submersible device used to pump water from a pond, lake, or any kind of body of water. The floatation device 9 allows the pumping system 7 to float on water in order to be easily retrieved when not in use. In order for the at least one treatment assembly 1 to be properly supported, the at least one treatment assembly 1 is mounted onto the main support structure 11. In the preferred embodiment, the at least one treatment assembly 1 is mounted onto the main support structure 11 by a set of fasteners. The set of fasteners may be any type of fastener such as, but not limited to, clamp fasteners, hook-and-loop fasteners, or band fasteners. The floatation device 9 is mounted onto the fluid pump 8. This arrangement prevents the fluid pump 8 from fully submersing down a body of water which allows a user to easily retrieve the fluid pump 8 when not in use. The floatation device 9 is tethered to the main support structure 11. This arrangement prevents the floatation device 9 from floating away from the present invention thus allowing a user to easily retrieve the pumping system 7. The fluid pump 8 is in fluid communication with the plurality of perforated pipes 2. This fluid communication may be established by a pipe or other similar conduit. Further, this arrangement allows a fluid to flow from the fluid pump 8 and into the plurality of perforated pipes 2. In addition, each of the plurality of perforated pipes 2 is in fluid communication with each other. This allows fluid to flow through each of the plurality of perforated pipes 2. Moreover, each of the plurality of perforated pipes 2 is sleeved by a corresponding cover from the plurality of filtering covers 3. This arrangement allows fluid to laterally flow out of the plurality of perforated pipes 2 and through the plurality of filtering covers 3. Thus, the fluid is filtered when processed through the at least one treatment assembly 1.

Figure 3:
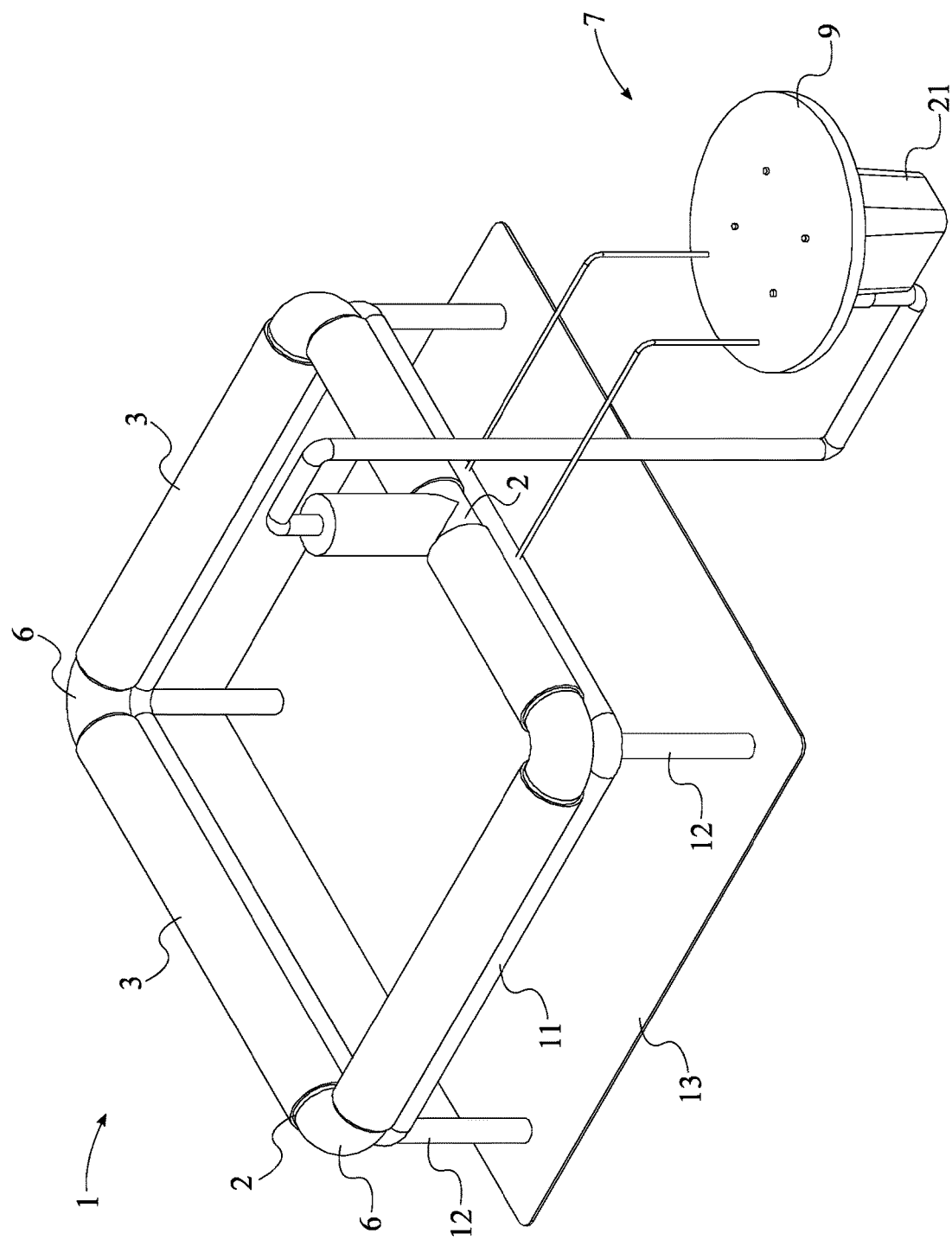
FIG. 3 is a rear perspective view of the present invention.

With reference to FIGS. 1 and 3, the present invention may further comprise a plurality of legs 12. The plurality of legs 12 is used to support the main support structure 11 off a ground surface. The present invention is preferably used on a ground surface when being used to filter a small body of water. The plurality of legs 12 is attached onto the main support structure 11, opposite to the plurality of perforated pipes 2. This arrangement allows the plurality of legs 12 to be removed when the present invention is not placed on a ground surface. Further, the plurality of legs 12 is oriented away from the plurality of perforated pipes 2 in order to properly support the main support structure 11 off a ground surface. Moreover, the plurality of legs 12 is distributed across the main support structure 11. This allows the weight of the main support structure 11 to be evenly distributed onto the plurality of legs 12.

Figure 4:
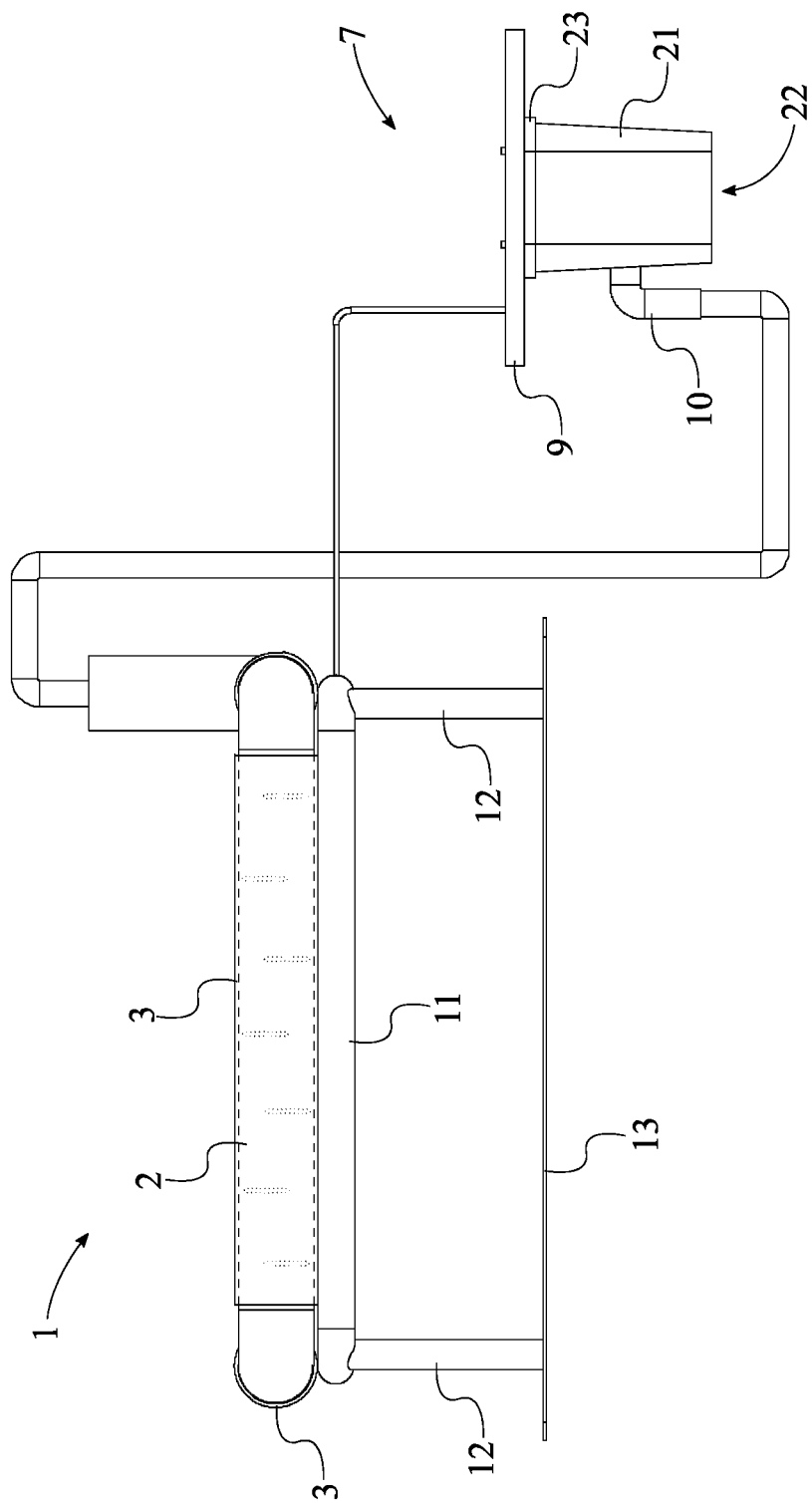
FIG. 4 is a left-side view of the present invention.

With reference to FIG. 4, the present invention may further comprise a liquid catch 13. The liquid catch 13 is used to collect the filtered water that seeps through the plurality of filtering covers 3. The liquid catch 13 may be any device able to collect a fluid. In the preferred embodiment of the present invention, the liquid catch 13 is a tarp. The liquid catch 13 is positioned adjacent to the plurality of legs 12, opposite the main support structure 11. The arrangement positions the liquid catch 13 underneath the main support structure 11. Moreover, the liquid catch 13 is positioned across the plurality of perforated pipes 2. This allows the liquid catch 13 to collect all the filtered water outputted by at the at least one treatment assembly 1.

Figure 7:
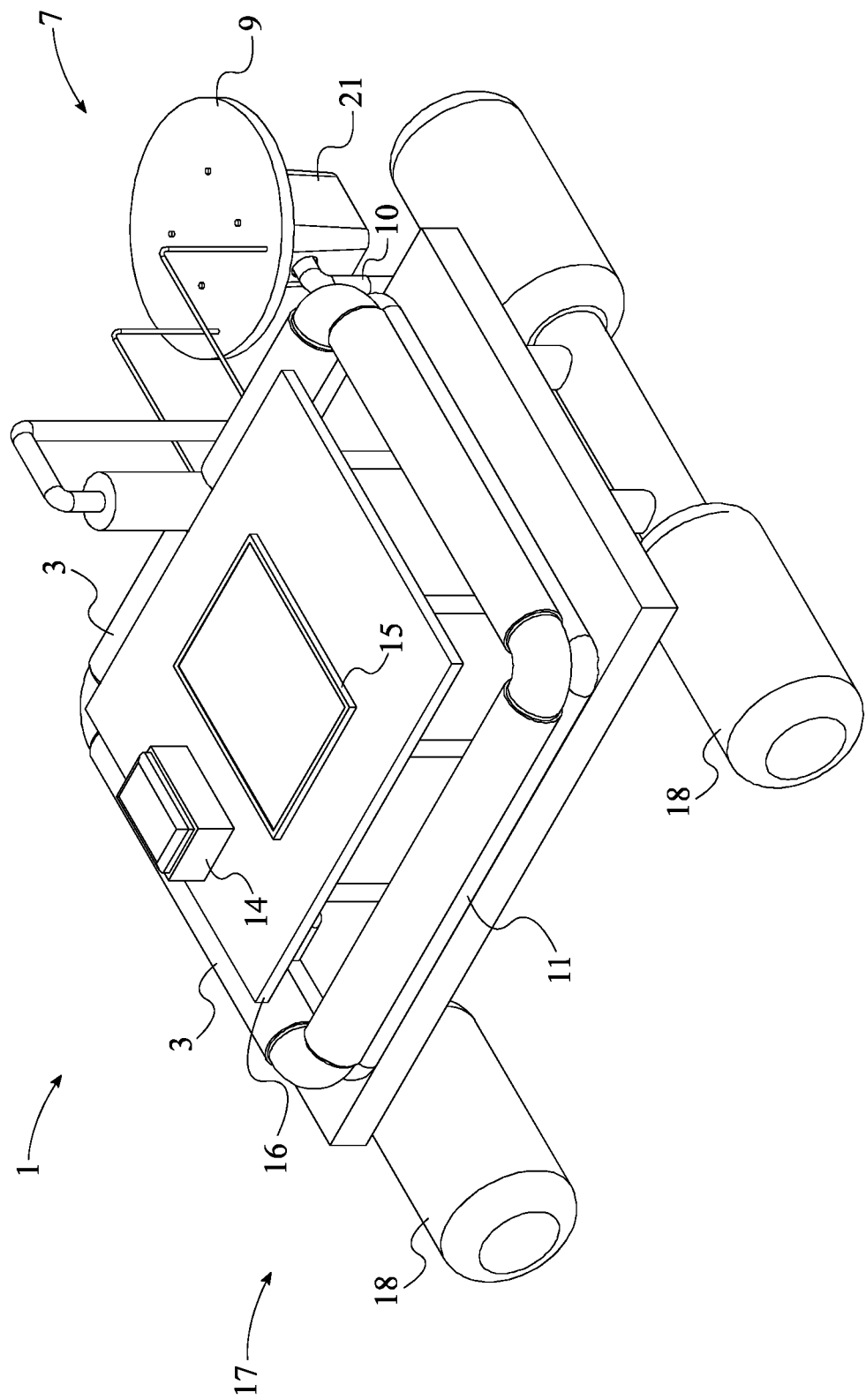
FIG. 7 is a front perspective view of the present invention displaying the solar panel, the portable power source, and the buoy system.
Figure 8:
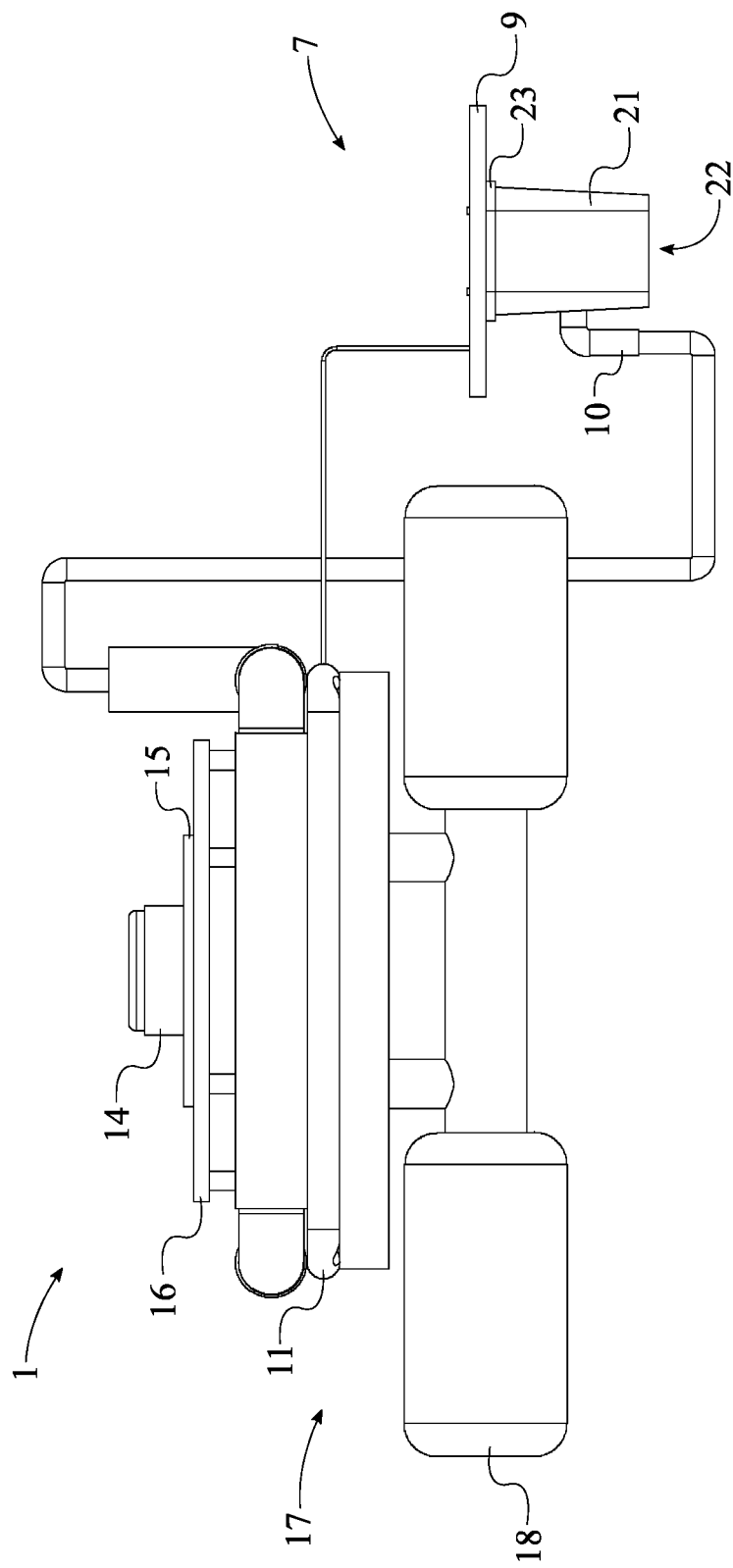
FIG. 8 is a left-side view of the present invention displaying the solar panel, the portable power source, and the buoy system.
Figure 9:
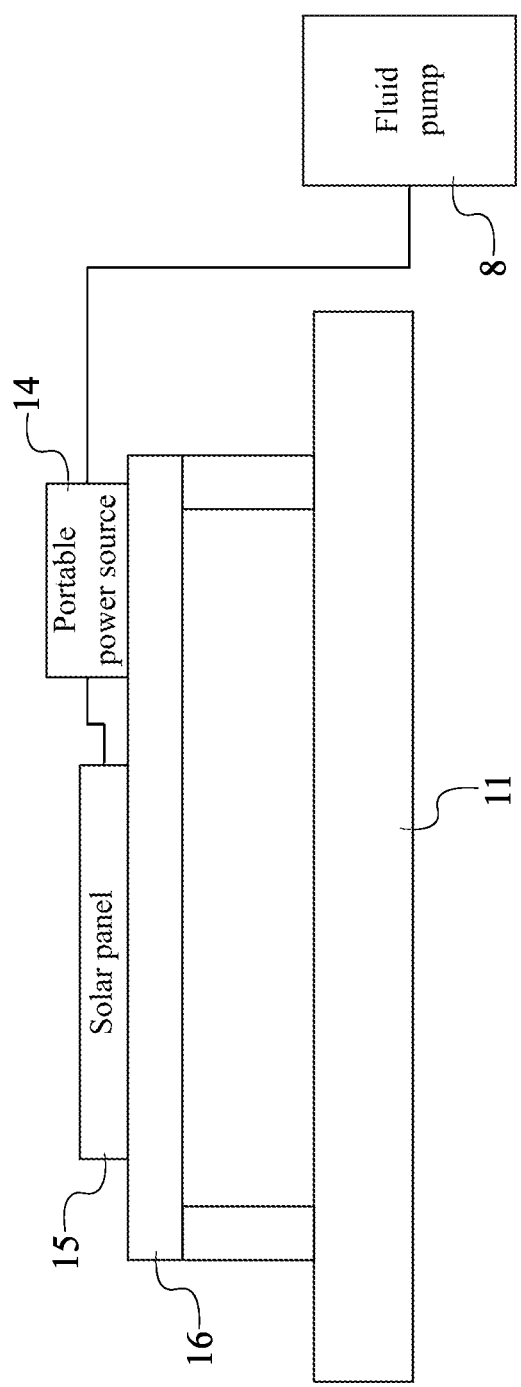
FIG. 9 is a schematic view of the present invention illustrating the electrical connections.

With reference to FIGS. 7, 8, and 9 and in order for the pumping system to be powered, the present invention may further comprise a portable power source 14, a solar panel 15, and a platform 16. The portable power source 14 is used to store and provide power to the fluid pump 8. The solar panel 15 is used to convert solar energy into electrical energy for the portable power source 14. The platform 16 is used to support the solar panel 15 and the portable power source 14. The platform 16 is attached onto the main support structure 11. In the preferred embodiment, the platform 16 is fitted or hooked onto the main support structure 11. The portable power source 14 and the solar panel 15 is mounted onto the platform 16, opposite the main support structure 11. This arrangement positions the solar panel 15 and portable power source 14 to be furthest away from water in order to avoid any electrical shortage problems. In order for the portable power source 14 to power the fluid pump 8, the portable power source 14 is electrically connected to the fluid pump 8. In order for the solar panel 15 to provide energy to the portable power source 14, the solar panel 15 is electrically connected to the portable power source 14. Further, the solar panel 15 is positioned across the platform 16. This arrangement positions the solar panel 15 to maximize exposure to the Sun and to gather the most amount of solar energy.

Figure 5:
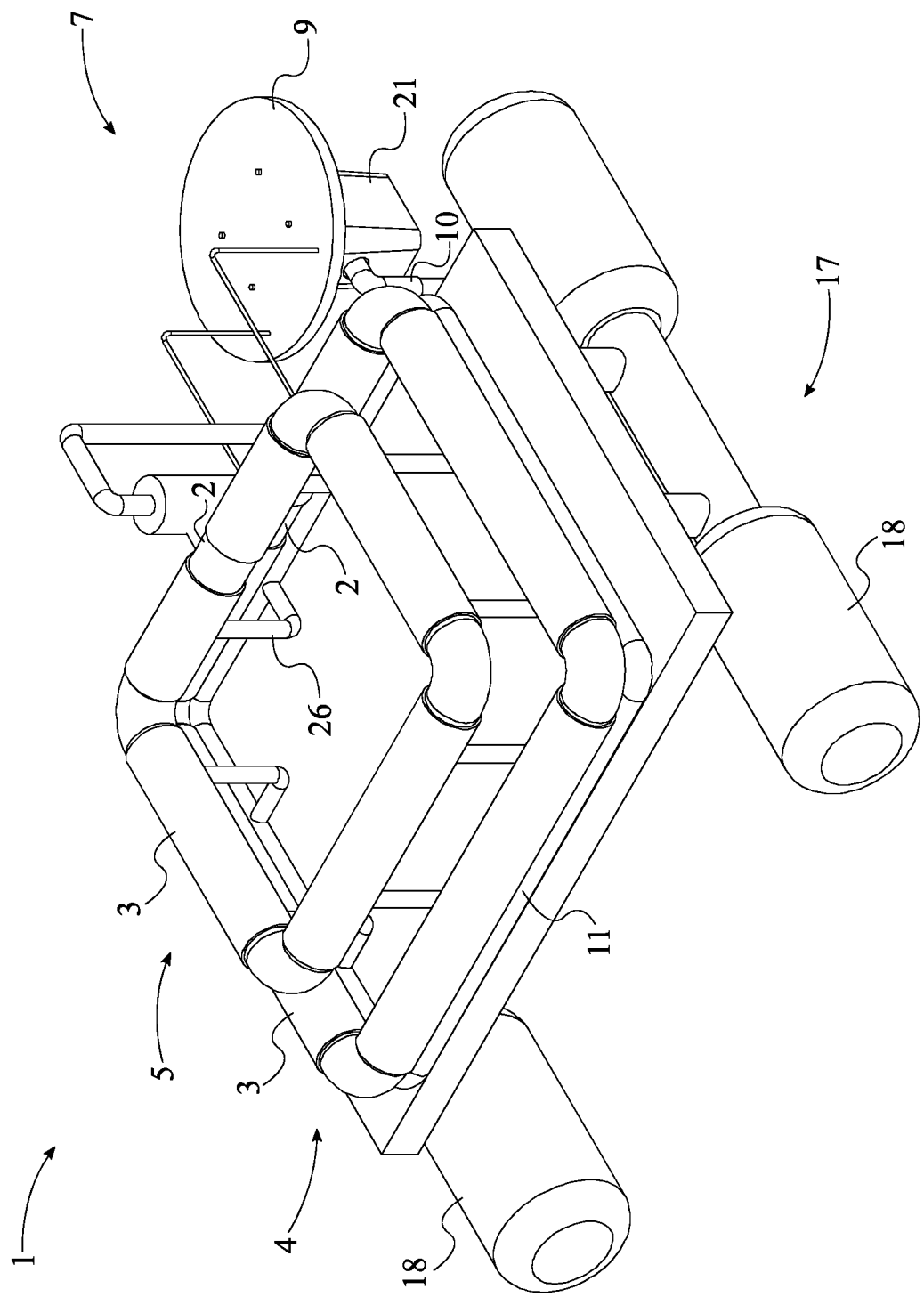
FIG. 5 is a front perspective view of the present invention displaying the at least one secondary treatment assembly and the buoy system.

With reference to FIGS. 5 and 7, the present invention may further comprise a buoy system 17. The buoy system 17 is preferably used when the present invention is used on larger bodies of water. The buoy system 17 allows the present invention to be used in water. In further detail, the main support structure 11 is able to float on water through the buoy system 17. The buoy system 17 is attached onto the main support structure 11, opposite to the plurality of perforated pipes 2. In further detail, the buoy system 17 is positioned underneath the main support structure 11 in order for the main support structure 11 to float on water.

With reference to FIGS. 5 and 7, in the preferred embodiment, the buoy system 17 comprises a plurality of pontoons 18. The plurality of pontoons 18 is a set of buoyant devices used to support the main support structure 11 on a body of water. The plurality of pontoons 18 is mounted across the main support structure 11, opposite the plurality of perforated pipes 2. This arrangement fully secures the plurality of pontoons 18 to the main support structure 11 in order to prevent the main support structure 11 from falling off the plurality of pontoons 18. Further, the plurality of pontoons 18 is positioned parallel and offset from each other. This allows the plurality of pontoons 18 to effectively support the weight of the main support structure 11.

Figure 10:
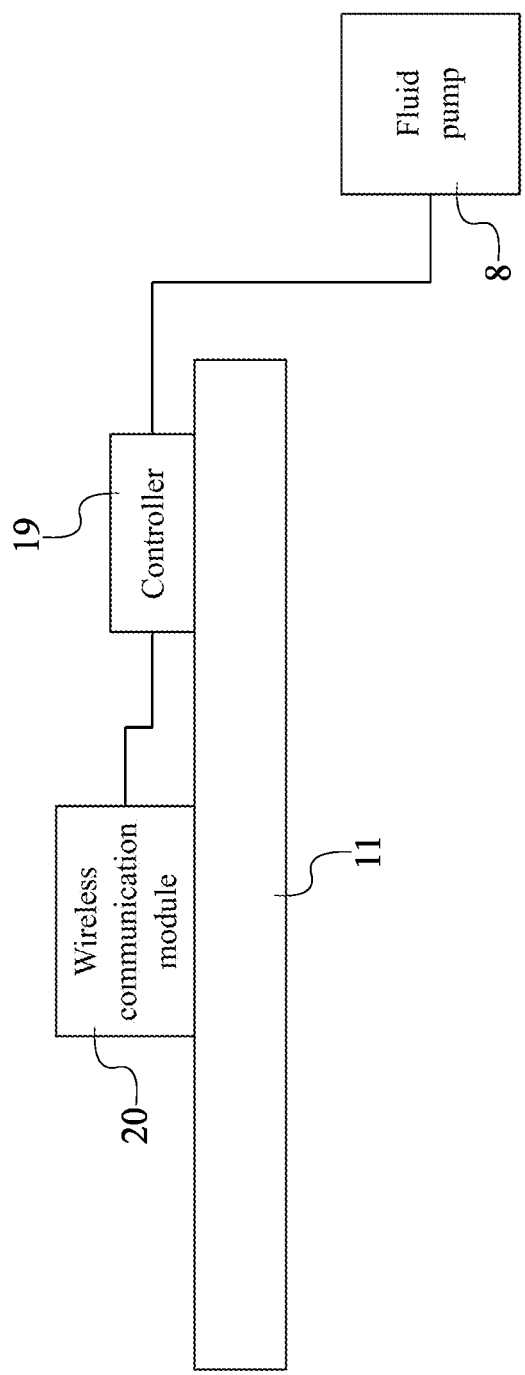
FIG. 10 is a schematic view of the present invention illustrating the electronic connections.

With reference to FIG. 10 and in order for the present invention to be remotely controlled, the present invention may further comprise a controller 19 and a wireless communication module 20. The controller 19 is used to manage and control the fluid pump 8 and wireless communication module 20. The wireless communication module 20 allows the present invention to be remotely controlled. The controller 19 and the wireless communication module 20 are mounted onto the main support structure 11. This arrangement positions the controller 19 and the wireless communication module 20 to avoid electrical shortage problems. Further, this arrangement protects the controller 19 and the wireless communication module 20. The controller 19 is electronically connected to the wireless communication module 20 and the fluid pump 8. This allows the controller 19 to effectively manage and control the fluid pump 8 and to send and to send and receive commands and information through the wireless communication module 20.

With reference to FIGS. 2 and 4 and in order for the fluid pump to be protected, the pumping system 7 further comprises a receptacle 21. The receptacle 21 is used to hold and protect the fluid pump 8. The receptacle 21 comprises a base 22 and an opening rim 23. The fluid pump 8 is positioned within the receptacle 21 in order for the fluid plump to be concealed and protected by the receptacle 21. The fluid pump 8 is mounted onto the base 22. This arrangement prevents the fluid pump 8 from moving around when inside the receptacle 21. The floatation device 9 is mounted onto the opening rim 23. This arrangement allows the pumping system 7 to float at the surface of a body of water while the fluid pump 8 is submersed. In further detail, the floatation device 9 is mounted onto the opening rim 23 by a set of fasteners. Preferably, the set of fasteners includes bolts and nuts.

With reference to FIG. 2, the present invention may further comprise a first gate 24 and a second gate 25. The first gate 24 and the second gate 25 are used to control the water flow into the receptacle 21. The first gate 24 and the second gate 25 are slidably and laterally mounted to the receptacle 21. This allows the user to slide the first gate 24 and the second gate 25 into open or closed positions. Further, the first gate 24 and the second gate 25 are positioned opposite to each other about the receptacle 21. This allows the user to control water flow from opposite sides of the receptacle 21. Moreover, the first gate 24 and the second gate 25 are positioned adjacent to the opening. This arrangement positions the first gate 24 and the second gate 25 against the floatation device 9 in order to effectively control the water flow into the receptacle 21.

With reference to FIGS. 2 and 4, the pumping system 7 further comprises a spout 10. The spout 10 outputs water that is pumped by the fluid pump 8. The spout 10 laterally traverses out of the container in order for spout 10 to be accessed by the at least one treatment assembly. The fluid pump 8 is in fluid communication with the plurality of perforated pipes 2 through the spout 10. Thus, water pumped by the fluid pump 8 can flow through the spout 10 and into the at least one treatment assembly 1.

With reference to FIG. 1, the plurality of perforated pipes 2 is arranged in a rectangular configuration in the preferred embodiment. The at least one treatment assembly 1 is easy to assemble or disassemble due to the rectangular configuration. Furthermore, the rectangular configuration allows the user to easily stack more than one treatment assembly upon each other.

Figure 6:
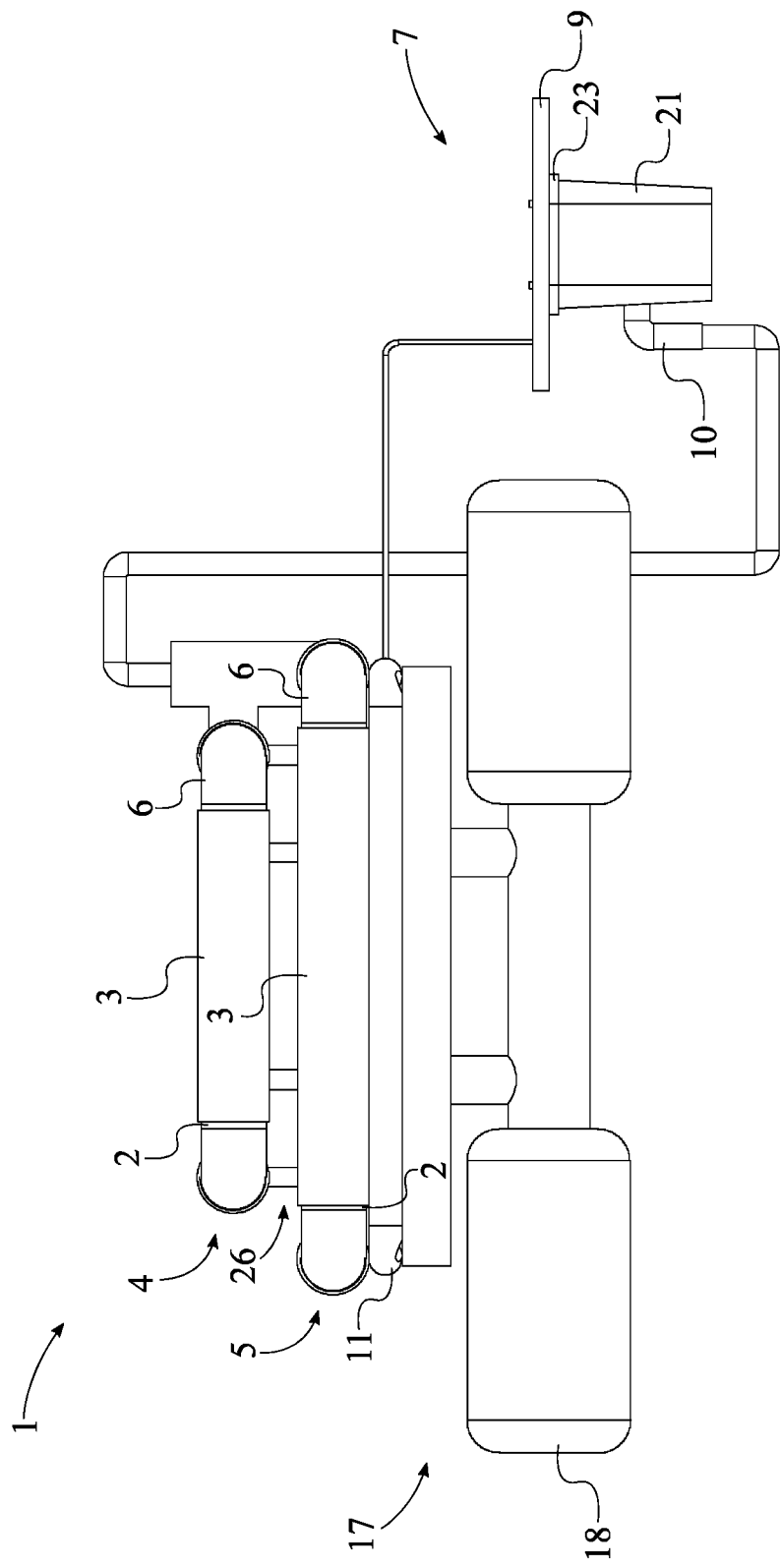
FIG. 6 is a left-side view of the present invention displaying the at least one secondary treatment assembly and the buoy system.

In another embodiment of the present invention and with reference to FIGS. 5 and 6, the present invention may further comprise at least one supplemental support structure 26. Further, the at least one treatment assembly 1 can be a primary treatment assembly 4 and at least one secondary treatment assembly 5. The at least one supplemental support structure 26 is used to support the at least one secondary treatment assembly 5. The at least one secondary treatment assembly 5 is used for larger bodies of water. The plurality of perforated pipes 2 of the primary treatment assembly 4 is in fluid communication with the plurality of perforated pipes 2 of the at least one secondary treatment assembly 5. This allows water to flow into and be filtered by the primary treatment assembly 4 and the at least one secondary treatment assembly 5. The plurality of perforated pipes 2 of the primary treatment assembly 4 and the plurality of perforated pipes 2 of the at least one secondary treatment assembly 5 are stackably positioned onto each other. This arrangement allows multiple treatment assemblies to treat a larger body of water. The plurality of perforated pipes 2 of the primary treatment assembly 4 is attached onto the main support structure 11. This arrangement secures the primary treatment assembly 4 in place. The plurality of perforated pipes 2 of the at least one secondary treatment assembly 5 is mounted onto the main support structure 11 by the at least one supplemental support structure 26. This arrangement secures the at least one secondary treatment assembly 5 in place.

With reference to FIGS. 1 and 3, the at least one treatment assembly 1 further comprises a plurality of pipe couplings 6. In the preferred embodiment, the plurality of pipe couplings 6 is a set of elbow pipes. The plurality of pipe couplings 6 is used to assembly and connect the plurality of perforated pipes 2 to each other. Each pair of pipes from the plurality of perforated pipes 2 is hermetically attached to each other through a corresponding coupling from the plurality of pipe couplings 6. This arrangement is used to provide tight seals between each connection of the plurality of perforated pipes 2. Further, this arrangement allows a user to dissemble the at least one treatment assembly 1 when not in use and the interior of the plurality of perforated pipes 2 needs to be cleaned.

In another embodiment of the present invention, the present invention may further comprise a trolling motor. This allows the present invention to traverse a body of water in order to effectively filter said body of water with the at least treatment assembly. The trolling motor is operatively coupled to the buoy system in order for the present invention to traverse a body of water. Alternatively, the present invention may further comprise a set of oars. The set of oars is situated on the buoy system. The set of oars allows a user to manually traverse a body of water if the said user is embarked upon the present invention.

Although the invention has been explained in relation to its preferred embodiment, it is to be understood that many other possible modifications and variations can be made without departing from the spirit and scope of the invention as hereinafter claimed.

What is claimed is:

1. A scum filtration system comprising:
    a treatment assembly;
    a pumping system;
    a main support structure;
    the treatment assembly comprising a plurality of perforated pipes and a plurality of filtering covers;
    the pumping system comprising a fluid pump and a floatation device;
    the treatment assembly being mounted onto the main support structure;
    the flotation device being mounted onto the fluid pump;
    the flotation device being tethered to the main support structure;
    the fluid pump being in fluid communication with the plurality of perforated pipes;
    each of the plurality of perforated pipes being in fluid communication with each other; and
    each of the plurality of perforated pipes being sleeved by a corresponding cover from the plurality of filtering covers.

2. The scum filtration system as claimed in claim 1 comprising:
    a plurality of legs;
    the plurality of legs being attached onto the main support structure, opposite to the plurality of perforated pipes;
    the plurality of legs being oriented away from the plurality of perforated pipes; and
    the plurality of legs being distributed across the main support structure.

3. The scum filtration system as claimed in claim 2 comprising:
    a liquid catch;
    the liquid catch being positioned adjacent to the plurality of legs, opposite the main support structure; and
    the liquid catch being positioned across the plurality of perforated pipes.

4. The scum filtration system as claimed in claim 1 comprising:
    a portable power source;
    a solar panel;
    a platform;
    the platform being attached onto the main support structure;
    the portable power source and the solar panel being mounted onto the platform, opposite the main support structure;
    the portable power source being electrically connected to the fluid pump; and
    the solar panel being electrically connected to the portable power source.

5. The scum filtration system as claimed in claim 4 comprising:
the solar panel being positioned on the platform.

6. The scum filtration system as claimed in claim 1 comprising:
a buoy system; and
the buoy system being attached onto the main support structure, opposite to the plurality of perforated pipes.

7. The scum filtration system as claimed in claim 6 comprising:
the buoy system comprising a plurality of pontoons;
the plurality of pontoons being mounted across the main support structure, opposite the plurality of perforated pipes; and
the plurality of pontoons being positioned parallel and offset from each other.

8. The scum filtration system as claimed in claim 1 comprising:
a controller;
a wireless communication module;
the controller and the wireless communication module being mounted onto the main support structure; and
the controller being electronically connected to the wireless communication module and the fluid pump.

9. The scum filtration system as claimed in claim 1 comprising:
the pumping system further comprising a receptacle;
the receptacle comprising a base and an opening rim;
the fluid pump being positioned within the receptacle;
the fluid pump being mounted onto the base; and
the floatation device being mounted onto the opening rim.

10. The scum filtration system as claimed in claim 9 comprising:
a first gate;
a second gate;
the first gate and the second gate being slidably and laterally mounted to the receptacle;
the first gate and the second gate being positioned opposite to each other about the receptacle; and
the first gate and the second gate being positioned adjacent to the opening rim.

11. The scum filtration system as claimed in claim 9 comprising:
the pumping system further comprising a spout;
the spout laterally traversing out of the receptacle; and
the fluid pump being in fluid communication with the plurality of perforated pipes through the spout.

12. The scum filtration system as claimed in claim 1 comprising:
the plurality of perforated pipes being arranged in a rectangular configuration.

13. The scum filtration system as claimed in claim 1 comprising:
at least one supplemental support structure;
another treatment assembly;
the another treatment assembly comprising a plurality of another perforated pipes and a plurality of another filtering covers;
the another treatment assembly being mounted onto the main support structure;
the fluid pump being in fluid communication with the plurality of another perforated pipes;
each of the plurality of another perforated pipes being in fluid communication with each other;
each of the plurality of another perforated pipes being sleeved by a corresponding cover from the plurality of another filtering covers;
the plurality of perforated pipes of the treatment assembly being in fluid communication with the plurality of another perforated pipes of the another treatment assembly;
the plurality of perforated pipes of the treatment assembly and the plurality of another perforated pipes of the another treatment assembly being stackably positioned onto each other;
the plurality of perforated pipes of the treatment assembly being attached onto the main support structure; and
the plurality of another perforated pipes of the another treatment assembly being mounted onto the main support structure by the at least one supplemental support structure.

14. The scum filtration system as claimed in claim 1 comprising:
the at least one treatment assembly further comprising a plurality of pipe couplings; and
each pair of pipes from the plurality of perforated pipes being hermetically attached to each other through a corresponding coupling from the plurality of pipe couplings.

* * * * *